(12) United States Patent
Singh et al.

(10) Patent No.: US 9,985,885 B1
(45) Date of Patent: May 29, 2018

(54) AGGREGATING COMMON PORTIONS OF FORWARDING ROUTES

(71) Applicant: Amazon Technologies, Inc., Seattle, WA (US)

(72) Inventors: Bijendra Singh, Cedar Park, TX (US); Kari Ann O'Brien, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 153 days.

(21) Appl. No.: 14/966,504

(22) Filed: Dec. 11, 2015

(51) Int. Cl.
*H04L 12/745* (2013.01)
*H04L 12/743* (2013.01)
*H04L 12/749* (2013.01)
*H04L 12/741* (2013.01)

(52) U.S. Cl.
CPC .......... *H04L 45/748* (2013.01); *H04L 45/741* (2013.01); *H04L 45/7453* (2013.01)

(58) Field of Classification Search
CPC .. H04L 45/7453; H04L 45/741; H04L 45/748
See application file for complete search history.

(56) References Cited

U.S. PATENT DOCUMENTS

| | | | |
|---|---|---|---|
| 7,433,355 B2 | 10/2008 | Wilson et al. | |
| 7,515,588 B2 | 4/2009 | Naik et al. | |
| 7,852,852 B2 | 12/2010 | Lynch et al. | |
| 8,717,793 B2 | 5/2014 | Maurya et al. | |
| 2003/0174717 A1 | 9/2003 | Zabarski et al. | |
| 2004/0236720 A1* | 11/2004 | Basso | G06F 17/30985 |
| 2005/0083935 A1* | 4/2005 | Kounavis | H04L 45/00 370/392 |
| 2010/0020806 A1* | 1/2010 | Vandat | H04L 45/00 370/395.31 |
| 2012/0250687 A1* | 10/2012 | Cao | H04L 45/02 370/392 |
| 2014/0003436 A1* | 1/2014 | Wang | H04L 45/7457 370/392 |
| 2014/0122791 A1* | 5/2014 | Fingerhut | H04L 49/00 711/108 |
| 2014/0269723 A1 | 9/2014 | Wang et al. | |
| 2015/0098470 A1* | 4/2015 | Sun | H04L 45/748 370/392 |

(Continued)

OTHER PUBLICATIONS

F. Pong, et al., "Concise Lookup Tables for IPv4 and IPv6 Longest Prefix Matching in Scalable Routers," IEEE/ACM Transactions on Networking, vol. 20, No. 3, Jun. 2012, pp. 729-741.

*Primary Examiner* — Joshua Kading
(74) *Attorney, Agent, or Firm* — Robert C. Kowert; Meyertons, Hood, Kivlin, Kowert & Goetzel, P.C.

(57) ABSTRACT

Common portions of forwarding routes in a routing table may be aggregated. A hash table may store common portions of forwarding routes in shared entries that include route aggregation maps. When a network packet is received, a shared entry may be identified that includes a common portion that is a longest matching portion of the destination address. The route aggregation map in the shared entry may then be evaluated to select a forwarding route described by the route aggregation map that matches a longest portion of the destination address subsequent to the common portion of the shared entry. The network packet may then be forwarded according to the selected forwarding route.

20 Claims, 12 Drawing Sheets

(56) References Cited

U.S. PATENT DOCUMENTS

2016/0255000 A1* 9/2016 Gattani .............. H04L 45/7453
    370/254
2017/0187624 A1* 6/2017 Goel .................... H04L 45/748

* cited by examiner

AGGREGATING COMMON PORTIONS OF FORWARDING ROUTES

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or others limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

Figure 1:
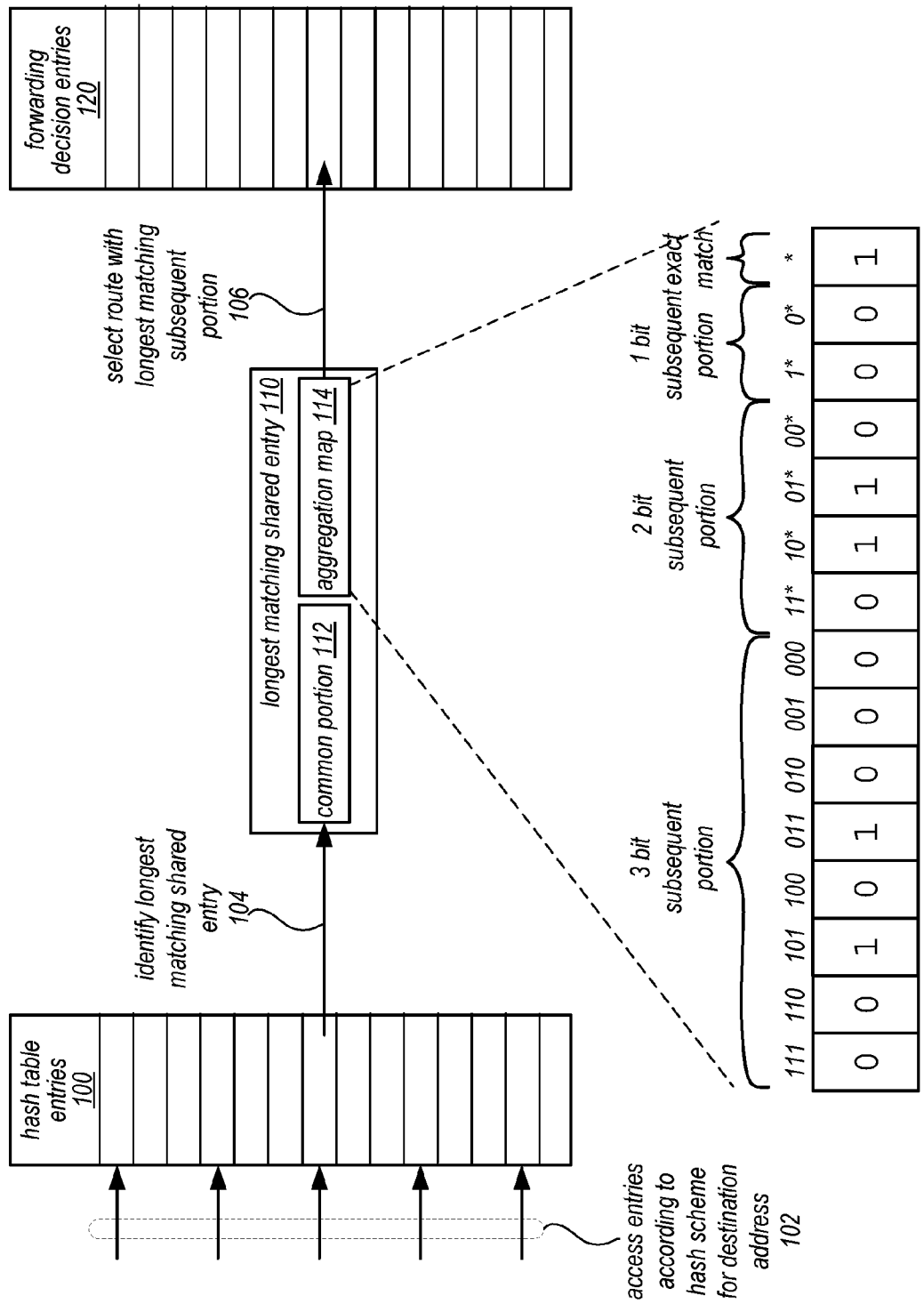
FIG. 1 illustrates a logical block diagram of aggregating common portions of forwarding routes, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement aggregation of common portions of forwarding routes. Network packets are packets of data (e.g., datagrams) sent across a network from a source networking device (e.g., a network interface card implemented at a computer or server) to a destination address representing an end networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. For example, a next hop address may be determined which identifies the next immediate destination to which the network packet may be sent. Once a forwarding decision is made, modifications to the packet may be performed, and the packet sent to a next networking device connected to the current networking device (or the networking packet may be dropped). Forwarding of the network packet may continue amongst the networking devices of a network until the network packet reaches the desired destination.

A forwarding route may be an address or portion of an address which if matching a destination address for a network packet identifies forwarding decisions to be made with respect to the network packet, such as a next hop address. In some instances, multiple forwarding routes may match a destination address, so a forwarding decision scheme, such as longest prefix matching, may be implemented to always choose as the forwarding decision the forwarding route that matches the longest portion of the destination address starting from the most significant bit of the destination address. In order to facilitate quickly identifying the appropriate forwarding address for a network packet various mechanisms have been developed. Content Addressable Memory (CAM), such as a ternary CAM (TCAM), may be used to perform a comparison function with respect to the destination address and forwarding routes. In scenarios, random access memory (RAM) may be implemented to store forwarding routes and thus an algorithmic lookup mechanism, such as hash scheme may be logically imposed on forwarding routes stored in the RAM.

As the number of forwarding routes that may be maintained in a packet processor or networking devices grows, the speed at which forwarding routes are identified and efficiency at which the forwarding routes may be stored become vital to provide high performance packet processing. As network protocols change, however, such tasks become even more challenging. For instance, network packets have been typically implemented utilizing Internet Protocol version 4 (IPv4) which provides a standard format for identifying unique locations through a 32 bit address. However, newer standards such as Internet Protocol version 6 (IPv6) are becoming more popular and are 128 bit address, consuming 4 times the amount of space as IPv4 addresses. In various embodiments, aggregating common portions of forwarding routes, whether represented in IPv4 or IPv6, can greatly increase the number of forwarding routes that can be maintained in the same space in memory. For example, by dividing an IPv6 forwarding route into four segments of 32 bits, and aggregating forwarding routes that share common portions of the 32 bits, an entry that describes one of the four segments of an IPv6 address can also store or represent multiple other addresses that share a common portion of that segment. If such space savings are performed at each segment entry out of four segments, a row in a forwarding table that includes one IPv6 address could represent the sum number of forwarding routes described by each of the individual segments. Thus a networking device implementing route aggregation can store additional forwarding routes by including a route aggregation map that identifies forwarding routes that share a common portion in the entry. For example, if each segment entry could store an additional 14 forwarding route segments, then 60 forwarding routes could be represented utilizing only 4 hash table entries (e.g., 15 routes in a segment+15 routes in a segment+15 routes in a segment+15 routes in a segment).

FIG. 1 illustrates a logical block diagram of aggregating common portions of forwarding routes, according to some embodiments. Hash table entries 100 may be maintained in shared entries for the forwarding routes of an entire routing table. Each entry may include a common portion, describing a portion that multiple forwarding routes share in common and a route aggregation map that distinguishes the different portions of the forwarding routes that are subsequent to the common portion of the entry. In this way, lookup techniques, such as longest prefix match techniques, can search fewer entries to obtain the same result, a longest prefix match with a forwarding route, and thus identify the forwarding route according to which the network packet is forwarded.

For example, different entries may be accessed 102 according to a hash scheme applied to a destination address for a network packet. These entries may be examined to identify the entry that contains a common portion that is the longest matching common portion with respect to the destination address, such as longest matching shared entry 110. Common portion 112 may be, in various embodiments, a prefix multiple (e.g., a multiple of 4, such as 4, 8, 12, 16, 20, 24, 28, and 32, which all forwarding routes in the entry share). Aggregation map 114 may identify the different bits which are truncated or subsequent to the prefix multiple, which may be different from other forwarding routes in the entry 110. To determine which one of the described routes in aggregation map 114 provides a subsequent portion that create the longest prefix match with respect to the destination address, the aggregation map 114 may be evaluated. For instance, in at least some embodiments, aggregation map 114 may be a digital tree (trie). Each entry in the trie may correspond to a different combination of bits that occur in a subsequent portion after the common portion. For example, in FIG. 1, the illustrated possible subsequent portions may be 3 bits, 2 bits, or 1 bit. Set bits in the different entries indicate the presence of a forwarding route with the bit values of the entry subsequent to the common portion 112. Once the longest matching subsequent portion is identified, that subsequent portion may identify the forwarding route that is the longest prefix match for the destination address 106, in order to forward the network packet in accordance with the corresponding forwarding decision associated with the forwarding route in forwarding decision entries 120.

Forwarding routes with different forwarding decisions, such as different next hop addresses, may be aggregated in the same shared entry. For example, one network packet may be received and sent according to a forwarding route identified in a shared entry that leads to destination address A, while another network packet may be received and sent according to another forwarding route identified in the same shared entry that leads to destination address B. In at least some embodiments, the number of bits set in a trie bitmap may equal a number of pointers in a pointer list to forwarding decision entries 120. When one of the entries in the trie bitmap is identified as the longest matching subsequent portion, then the location of the forwarding decision entry in entries 120 may be determined based on the entry set in the trie bitmap (e.g., by incrementing address from a base address location in forwarding decision entries equal to the order for a number of bits set prior to and including the identified bit set in the trie bitmap). For instance, if the bit set in the trie bitmap is the third bit set (e.g., from longest possible to shortest possible subsequent portion), then the address may be incremented 3 times.

Please note that the previous description of aggregating common portions of routes is not intended to be limiting but is provided as a logical example of route aggregation. Different organization of components, entries, and other depicted items may be different than those illustrated in FIG. 1.

This specification begins with a general description of a networking device, which may utilize aggregation of common portions of forwarding routes to perform forwarding of network packets at a packet processor. Then various examples of a packet processor are discussed, including different components/modules, or arrangements of components/modules that may be implemented and lookup forwarding routes in shared entries that aggregation multiple forwarding routes for forwarding network packets. A number of different methods and techniques to implement aggregation of common portions of forwarding routes to perform forwarding of network packets are then discussed, some of which are illustrated in accompanying flowcharts. Various examples are provided throughout the specification.

Figure 2:
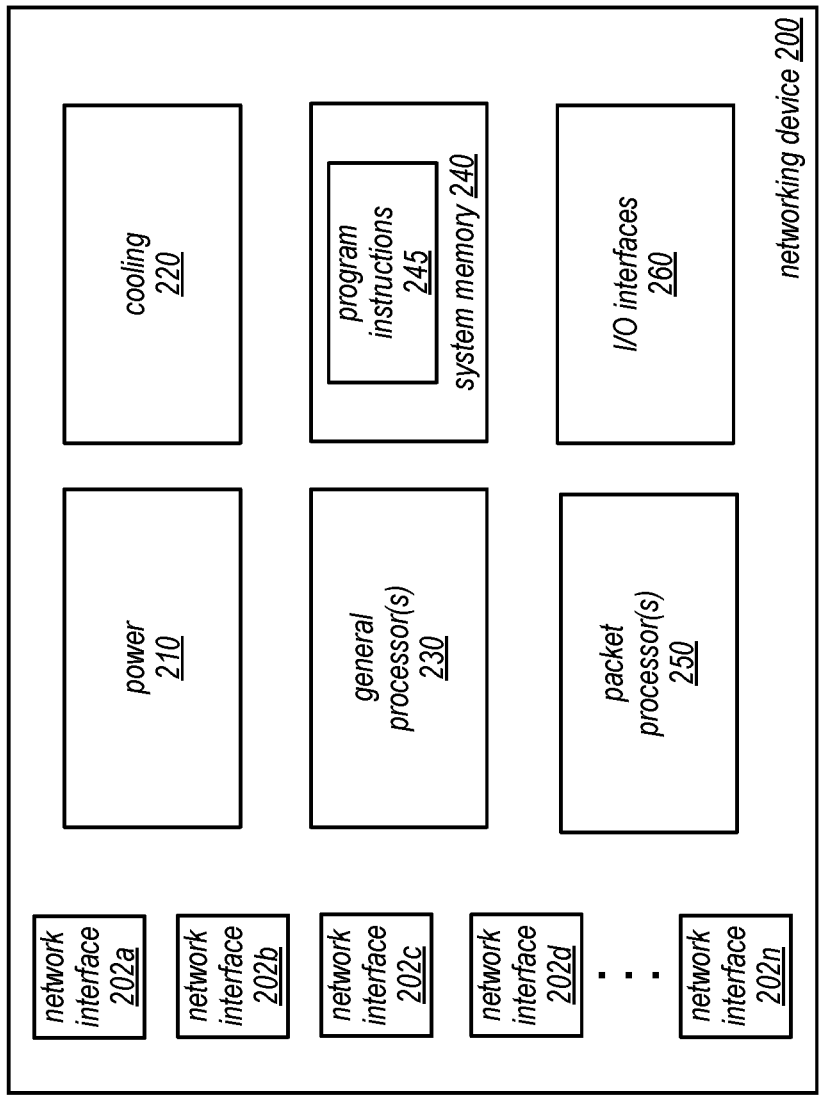
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, insert or remove forwarding routes, etc.). Additionally, a controller may be able to access network packets trapped or logged by a packet processor 250 for further analysis and direct processing actions to be performed by packet processor 250 for the network packet. In at least some embodiments, a controller may be able to extract trace information from a network packet and provide the trace information for analysis (e.g., to another application executing on processor(s) 230 or sending the trace information over a network connection to a different system for analysis).

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
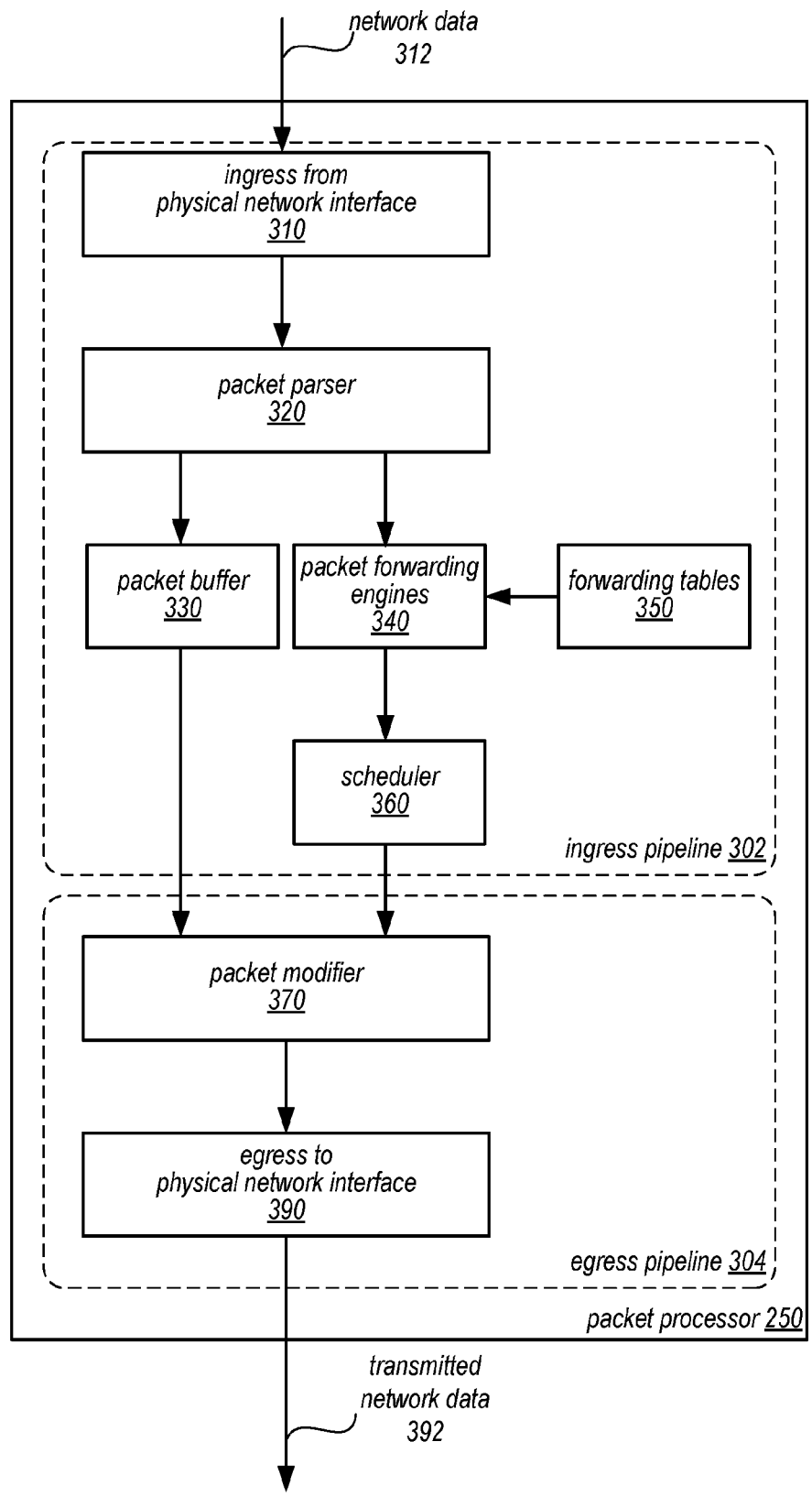
FIG. 3 is a logical block diagram illustrating a packet processor that process network packets utilizing aggregated common portions of forwarding routes, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing, such as a System on a Chip (SoC). Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that performs network packet tracing, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port identified in the packet header. If the MAC address is known but attached to a different port than indicated in the MAC address table, then an operation may be performed to move the source MAC address to the port identified in the packet header. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding, such as L3 forwarding engine 400 discussed in FIG. 4 below, in some embodiments. For example, internet protocol (IP) headers for the packet may be evaluated with respect to entries in tables, such as a routing or next hop table, to determine forwarding to be performed. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
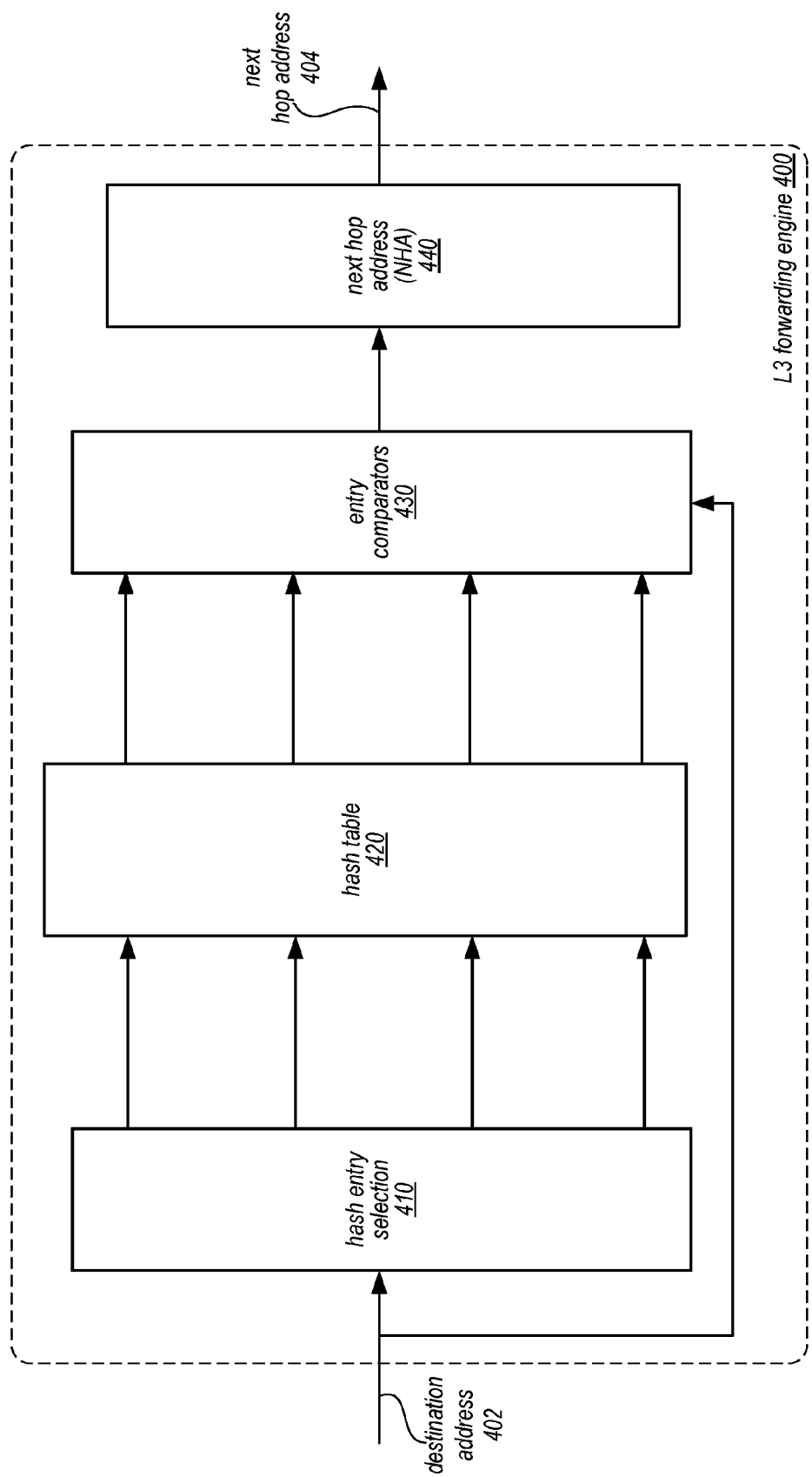
FIG. 4 is a logical block diagram illustrating a forwarding engine that utilizes aggregated common portions of forwarding routes, according to some embodiments.

FIG. 4 is a logical block diagram illustrating a forwarding engine that utilizes aggregated common portions of forwarding routes, according to some embodiments. L3 forwarding engine 400 may be one of many forwarding and/or decision engines implemented as part of packet forwarding engines 340. A destination address 402 may be received as part of packet metadata for a network packet. Hash entry selection 410 may apply a hash scheme to determine which entries should be read in hash table 420. For example hash entry selection 410 may divide a destination address into segments, such as discussed below with regard to FIGS. 7 and 8, and then generate different sub-segments of the segments. A hash function may be applied to the sub-segments in order to determine hash key values for the different sub-segments. For example, if a modulo-based hash function is applied, then various components and techniques may be implemented by hash entry selection 410 to calculate the corresponding hash key values for the modulo-based hash function.

Figure 5:
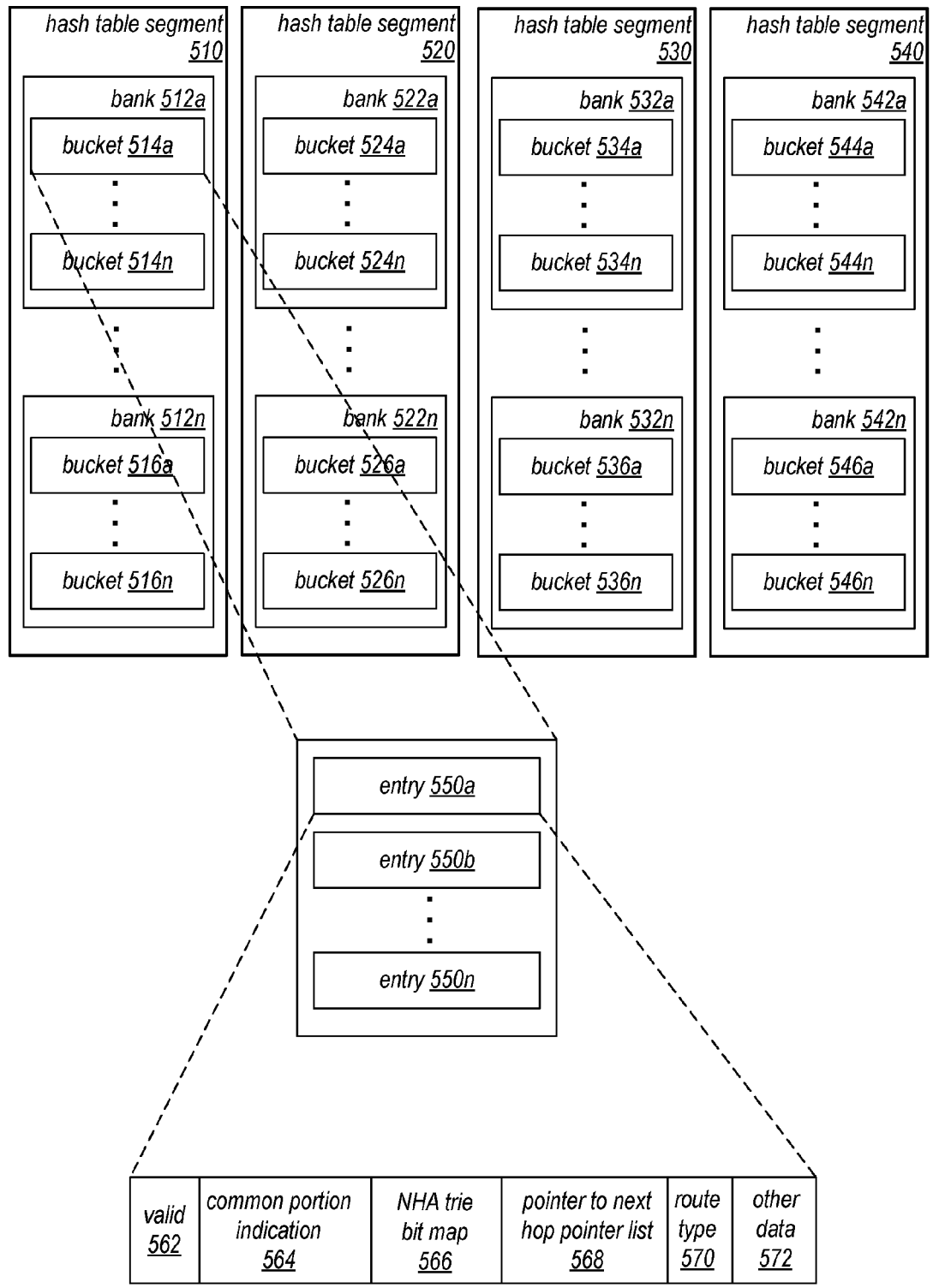
FIG. 5 is a logical block diagram illustrating memory organization for a hash table maintaining shared entries for common portions of forwarding routes, according to some embodiments.

Once the hash keys are generated, read operations may be performed with respect to hash table 420 to retrieve the entries at the hash key determined locations. Hash table 420 may be maintained in one or multiple memory devices (e.g., static random access memory (SRAM), dynamic random access memory (DRAM), or any other volatile or non-volatile random access memory). Hash table 420 may be implemented with one or more multiple logical organizations so that the same components implementing the memory maintaining the hash table (e.g., one or SRAM devices) may be utilized to perform forwarding for different types of network packets (e.g., both IPv4 and IPv6). FIG. 5 is a logical block diagram illustrating memory organization for a hash table maintaining shared entries for common portions of forwarding routes, according to some embodiments. In at least some embodiments, hash table 420 may be organized into multiple segments, partitions, or tables, such as segments 510, 520, 530, and 540. Segments may contain multiple banks 512 which may be the unit at which a read is perform to read an identified bucket. Thus, as illustrated in FIG. 5, a read may be performed to banks 512*a* through 512*n*, 522*a* through 522*n*, 532*a* through 532*n*, and 542*a* through 542*n*. Each bucket may contain a number of entries, such as entries 550*a* through 550*n*.

Entries may contain various information to identify both the common portion of forwarding routes represented in the entry and the route aggregation map to describe those forwarding routes with different subsequent portions to the common portion. Valid field 562 may identify whether or not NHA trie bitmap 566 is valid. If not valid, then no routes may be aggregated for the entry. Common portion indication 564 may be the representation of the common portion, whether the actual common portion value or other value generated to represent the common portion (e.g., the quotient portion and/or the quotient portion XOR'd with the remainder portion of another entry linked to the entry). NHA trie bitmap 566 may in some embodiments be a bitmap that identifies both the truncated bits of forwarding routes as a result of rounding down the forwarding route to the common portion and identify the particular NHA pointers of a list of pointers that corresponds to the different forwarding routes identified in the bitmap. Route type field 570 may indicate whether the entry is an IPv4 or an IPv6 destination address. Other data field 572 may indicate other information such as whether or not the entry is migrated, the hash key value for the entry, the hash key value for a linked entry prior to the entry, and a length of the prefix multiple of the common portion.

These segments may not necessarily correspond to hardware components and thus may logically be treated differently when processing one type of network packet versus another. For example, the number of segments, banks, and numbers of buckets with in banks may be organized differently for one type of network packet. Although four segments are illustrated in FIG. 5, for IPv4 network packets the hash table may be logically viewed as 8 separate tables, each with 1024 buckets including 14 entries in each bucket. Whereas the logical organization depicted in FIG. 5 may be implemented for IPv6 network packets, with 4 table segments, 8 banks per segment, 256 buckets per bank, and 14 entries per bucket. The logical organization of entries may, in some embodiments, be the same. In this way, the entries themselves are not reorganized when processing different network packets. Instead, the application of the hash scheme to determine which buckets to read may change which entries are read in an identified bucket (either entries marked for IPv6 or marked for IPv4) and/or how many reads are performed (e.g., 8 reads to one bucket in each of the different tables or 32 reads to one bucket in each of the different banks.

Turning back to FIG. 4, the entries read from hash table 420 may be provided to entry comparator 430. Entry comparator 430 may implement the various components and techniques to identify the entry with the common portion that is the longest matching common portion with respect to destination address 402 and evaluate the included route aggregation map, according to the various techniques discussed below with regard to FIGS. 9 and 10. For example, entry comparator 430 may calculate the various representations of segments according to destination address 402 and compare them with representations retrieved from the entries in hash table 420. Entry comparator 430 may obtain truncated bits from subsequent portion of the destination address with respect to an identified common portion and examine corresponding entries in a trie bitmap to determine whether a forwarding route at that possible subsequent portion length is identified by the trie bitmap. Entry comparator 430 may also determine a next hop address pointer based on the aggregation map, for example, by modifying a pointer to the list of pointers according to the number of bits set in the trie bitmap prior to the set bit identifying a forwarding route for destination address 402. Consider an example where a pointer to a list of pointers is included in the aggregation map. To determine the specific pointer to an entry in a next hop address table, an offset may be applied to the pointer list pointer, effectively modifying the pointer list pointer to be a pointer to the appropriate next hop address entry. An offset, or other modification, may be determined based on the entry for the longest matching subsequent portion (e.g., by determining the number of entries prior to the identified entry and using that determined number as the offset or the number to determine the offset). Once a pointer to next hop address table 440 is identified, then entry comparator my instigate reading the next hop address from the table to determine the next hop address 404.

The examples of aggregating common portions of forwarding routes as discussed above with regard to FIGS. 2-5 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may utilize aggregations of common portions of forwarding routes. In addition to examples given above, the techniques discussed below with regard to FIGS. 6-12 may be also implemented using the various components discussed above as well as different types of systems or devices that perform packet processing.

Figure 6:
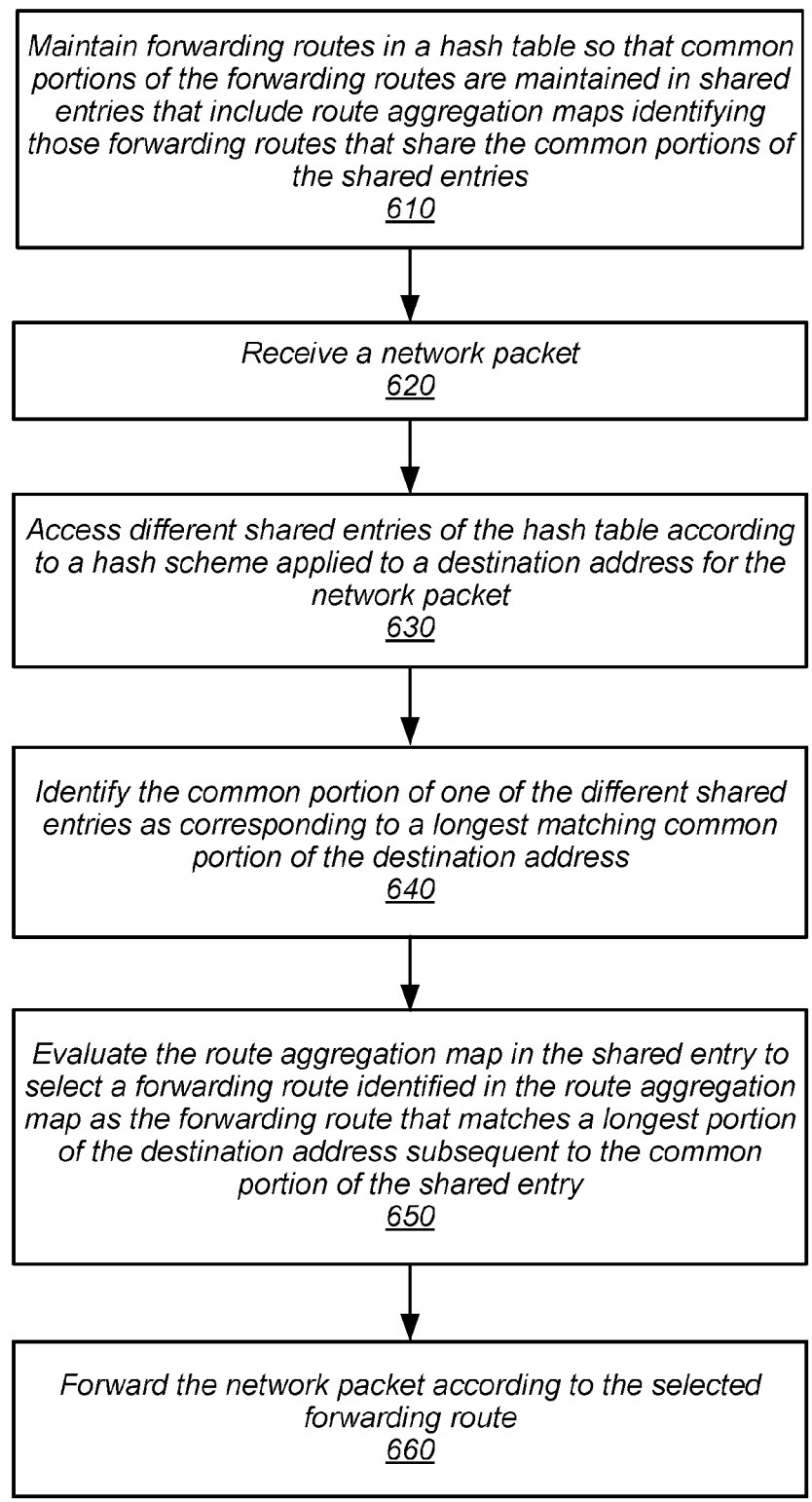
FIG. 6 is a high-level flowchart illustrating various methods and techniques to make a forwarding decisions according to a forwarding route identified in a shared entry with other forwarding routes, according to some embodiments.
Figure 8:
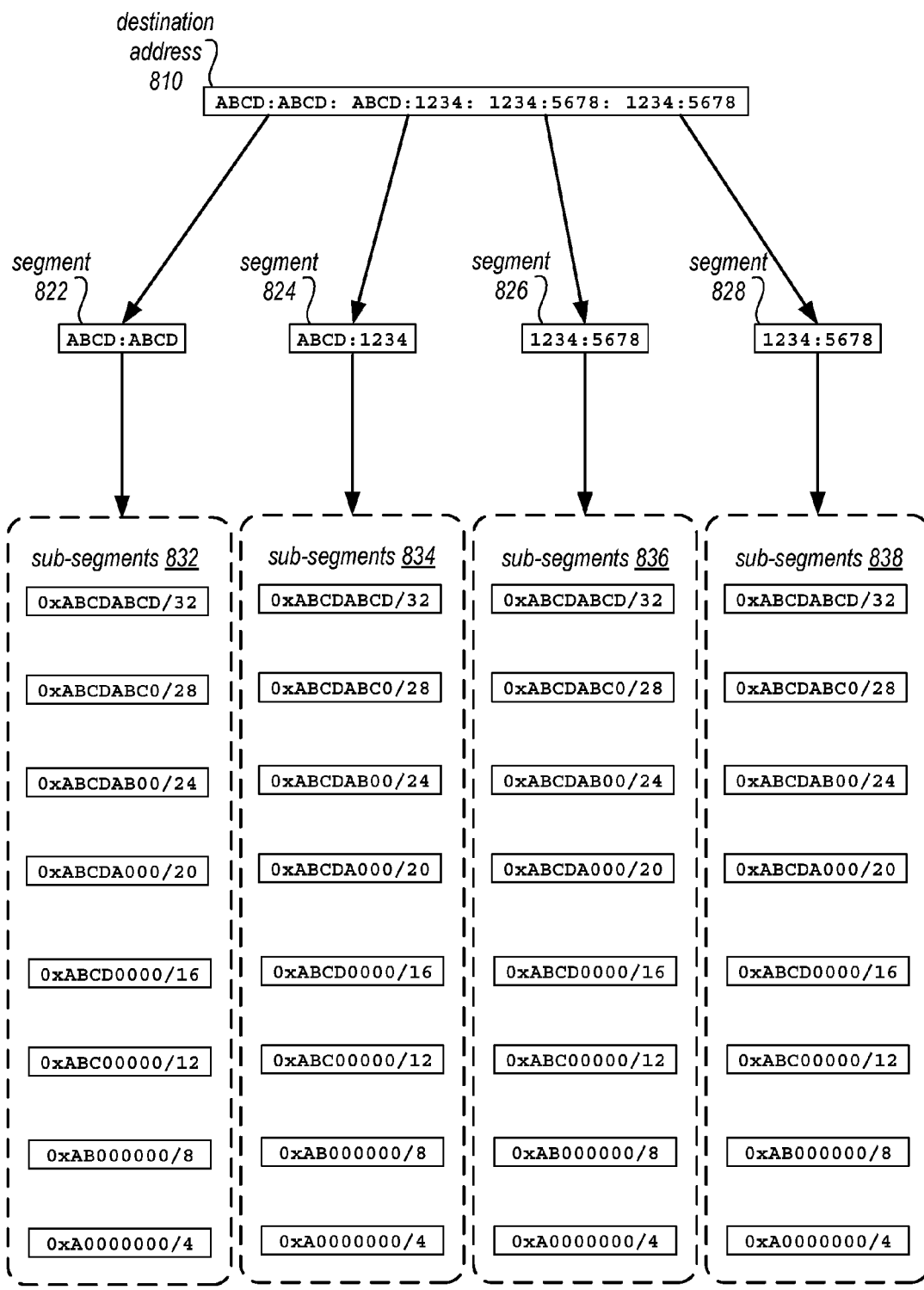
FIG. 8 is a logical diagram of a destination address divided into segments and sub-segments for identifying shared entries of a hash table, according to some embodiments.

FIG. 6 is a high-level flowchart illustrating various methods and techniques to make forwarding decisions according to a forwarding route identified in a shared entry with other forwarding routes, according to some embodiments. As indicated at 610, forwarding routes may be maintained in a hash table so that common portions of the forwarding routes may be maintained in shared entries. As discussed above with regard to FIG. 5, the shared entries may include entries that share common portions of a same type of forwarding route. For example, a shared entry may maintain a common portion for multiple IPv4 forwarding routes. Shared entries may also include route aggregation maps which identify those forwarding routes that share the common portions indicated in the shared entries. Different types of forwarding routes may be maintained in a different number of entries. For instance, IPv4 forwarding routes may be maintained in one entry, for the entire 32 bit route, whereas IPv6 forwarding routes may be maintained in 4 different entries, each corresponding to a different 32 bit segment of the IPv6 forwarding route (as illustrated in FIG. 8 below). The forwarding routes may be maintained in a memory accessible to a packet processor so that the shared entries may be accessed by the packet processor. Similarly, the memory may be accessible to other computing devices, such as a general purpose processor executing program instructions on another memory to perform routing table management operations, including inserting or removing forwarding routes, as discussed below with regard to FIGS. 11 and 12.

As indicated at 620, a network packet may be received at the packet processor. Network packets may be a discrete portion of the stream of data transmitted over various types of network connections, such as twisted pair connections, coaxial connections, or fiber optic connections, or other wired or wireless connections formatted according to various transmission protocols to a destination address. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4.

As indicated at 630, in various embodiments, different shared entries of the hash table may be accessed according to hash scheme for the hash table applied to the destination address for the network packet. Different hash schemes may be implemented to distribute common portions of the forwarding routes among hash table buckets and/or entries. For example, bloom filter hashing techniques, modulo-based hashing techniques, or consistent hashing techniques are some of the many different hashing techniques that may be implemented. In at least some embodiments, a hash technique may be implemented that transforms different route prefixes to determine hash key values for the route prefixes. For example, a hash scheme that may be implemented which utilizes polynomial division to obtain distinct quotient and remainder pairs generated for transformed route prefixes to distinguish between route prefixes. This allows for remainder values generated for a forwarding route prefix to serve as keys to hash entries in the hash table, which may store quotient values which can be used to determine whether a common portion of the entry that generated the quotient value matches the destination address. Forwarding route prefixes may be transformed by rounding down prefixes to a prefix multiple (e.g., multiples of 4, such as 4, 8, 12, 16, 20, 24, 28, and 32). Quotient and remainder pairs for a forwarding route may be determined by performing modulo-2 polynomial division upon a rounded down route prefix using a predetermined polynomial P. Please note that the previous examples of hash schemes are not intended to be limiting and thus different hash schemes may be implemented for identify shared entries for forwarding routes in a hash table.

Figure 7:
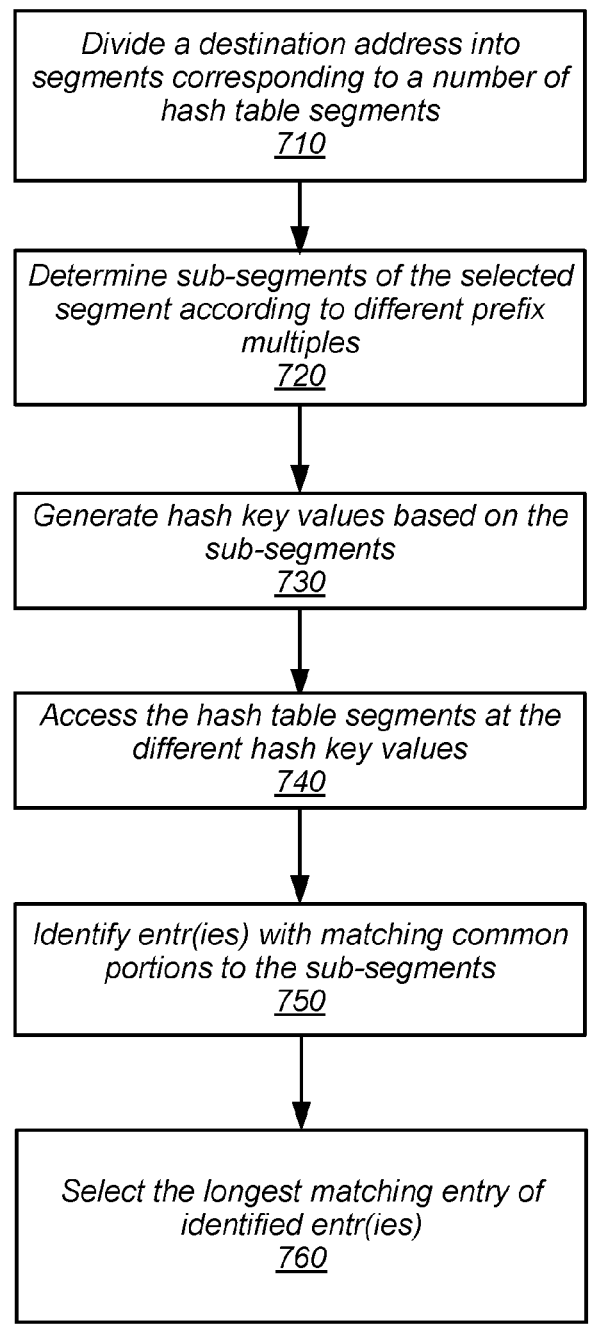
FIG. 7 is a high-level flowchart illustrating various methods and techniques to identify a common portion of a shared entry as matching a longest portion of a destination address for a network packet, according to some embodiments.

As indicated at 640, the common portion of one of the different shared entries may be identified as corresponding to a longest matching portion of the destination address. The common portion of shared entries may, in some embodiments, a common prefix portion or multiple of a portion of forwarding routes that share the entry. For example, common portion may be a prefix multiple, such as 4, 8, 12, 16, 20, 24, 28, or 32 bits out of a 32 bit value of an IPv4 forwarding route, or a 32 bit segment of an IPv6 forwarding route. The longest matching portion of the destination address may be a longest portion starting from the most significant bit of the destination address to the last matching bit of the destination bit of the address that matches a common portion in one of the entries of the hash table. For destination addresses that are maintained across multiple entries, the common portions of entries may be linked together to describe a forwarding route. For such destination addresses, the identified common portion may be the common portion of the last entry in the chain of entries describing the forwarding route. Consider a forwarding route of 1234:1234:9876:9876:5555:555A:/94. Three segments and thus three entries may be required to store the forwarding route, an entry for 1234:1234/32, an entry for 9876:9876/32, and an entry for 5555:555A/30. The identified shared entry may be an entry with a common portion that represents 5555:555A/30 (note that because the final segment is not a complete 32 bits, the matching common portion may be prefix multiple, such as 5555:5550/28 with a route aggregation route indicating the truncated bits of "101" that is equivalent to "A"). FIGS. 7 and 8, discussed below, provide different examples of identifying the common portion of a shared entry as corresponding to a longest matching common portion of the destination address. Note that in discussing forwarding routes CIDR notation may be used.

Figure 9:
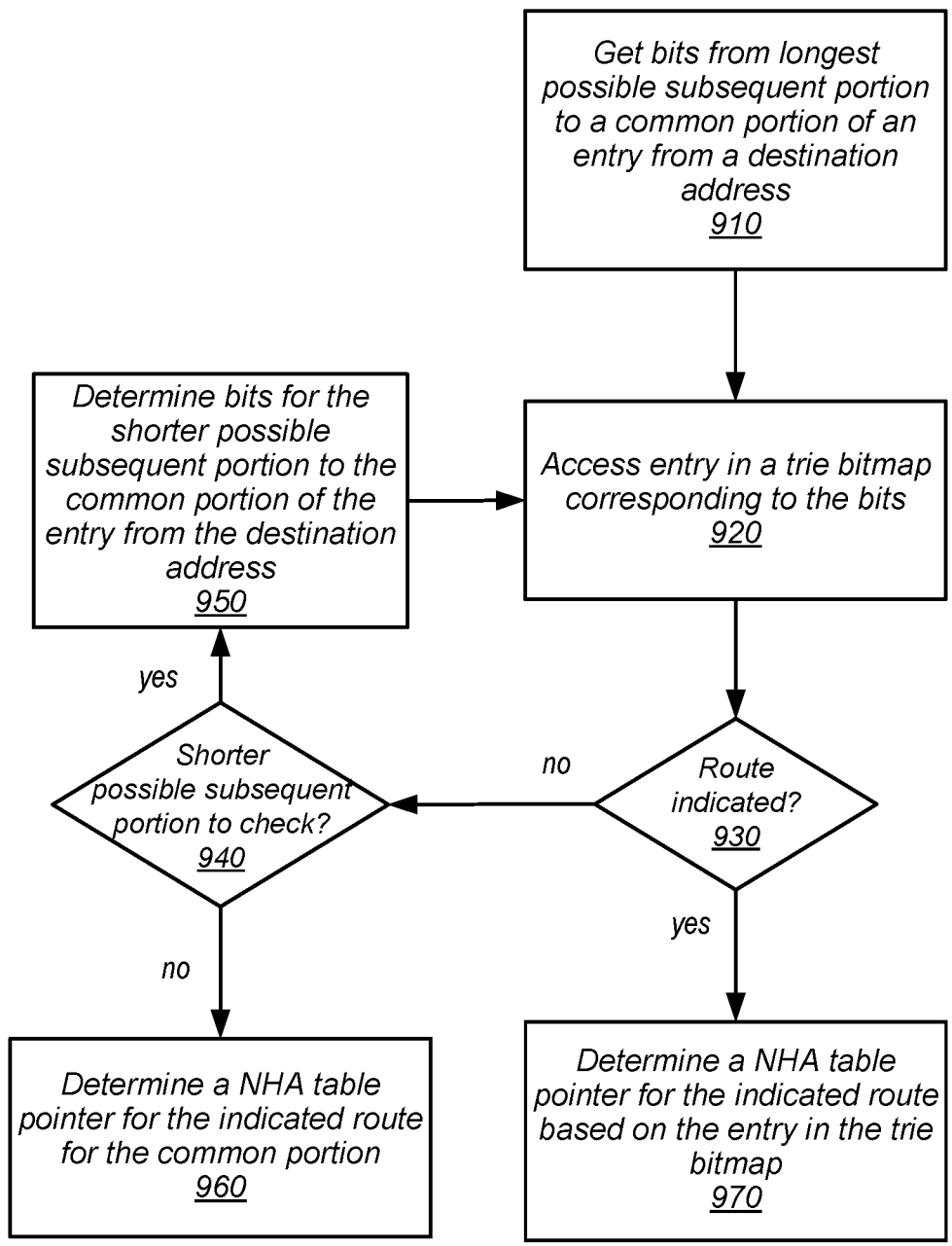
FIG. 9 is a high-level flowchart illustrating various methods and techniques to evaluate a trie bitmap that provides route aggregation for a shared entry, according to some embodiments.

While the common portion of the identified entry may be the longest matching common portion, forwarding routes that included subsequent portions aggregated in the shared entry of the common portion may be a longer prefix match for the destination address. As indicated at 650, the route aggregation map in the shared entry may be evaluated to select a forwarding route identified in the route aggregation map as the forwarding route that matches a longest portion of the destination address subsequent to the common portion of the shared entry. Route aggregation maps may be any data structure or other indication that distinguishes between different forwarding routes that share the common portion and which may terminate into don't care values prior to a different shared entry (e.g., forwarding routes less than a higher prefix multiple than the prefix multiple of the identified entry). For example, a route aggregation map may describe the bit values of different forwarding routes that are common up to the common portion but are less than a next prefix multiple of 4, and thus describe various combinations 3 bit subsequent portions, 2 bit subsequent portions, or 1 bit subsequent portions. Route aggregation maps may also distinguish different pointers to a next hop address table (or other forwarding decision table) so that routes with different next hop addresses can be aggregated in the same entry. In at least some embodiments, a route aggregation map may be a trie bitmap. FIGS. 8 and 9 discuss various techniques for evaluating route aggregation maps, such as a trie bitmap, to select a forwarding route with the longest subsequent portion and to determine a pointer to a next hop address corresponding to the selected forwarding route.

As indicated at 660, the network packet may be forwarded according to the forwarding route selected for the network packet. In some embodiments, modifications to the network packet, such as tunnel header insertions, metadata modifications, and other packet operations may be performed dependent upon the selected forwarding route.

Prefix lengths for destination addresses of received network packets are unknown. Therefore, techniques to identify a longest matching prefix portion of a destination address with respect to forwarding routes in a routing table may need to account for the possibility of different prefix lengths. When maintaining forwarding routes in shared entries that aggregate forwarding routes with common portions, determining the size or length of the common portion to evaluate may allow the longest common portion to be identified. FIG. 7 is a high-level flowchart illustrating various methods and techniques to identify a common portion of a shared entry as matching a longest portion of a destination address for a network packet, according to some embodiments.

As indicated at 710, a destination address may be divided into segments corresponding to a number of segments of the hash table. FIG. 8 is a logical diagram of a destination address divided into segments and sub-segments for identifying shared entries of a hash table, according to some embodiments. For instance, destination address 810 is a 128 bit address which may be divided into four, 32 bit segments, segments 822, 824, 826, and 828. Each of these segments may potentially match a longest common portion in a shared entry for a forwarding route. Therefore, different length sub-segments of the different segments may be determined, as indicated at 720. For example, sub-segments 832 in FIG. 8 include different lengths of "ABCD:ABCD," such as lengths of 32, 28, 24, 20, 16, 12, 8, and 4 bits. In at least some embodiments, the sub-segment lengths may correspond to prefix multiples (as discussed below with regard to FIG. 10) so that the common portions of forwarding routes stored in different shared entries may match have matching lengths for performing bitwise comparisons to detect a match.

As indicated at 730, hash key values may be generated for the sub-segments according to a hash scheme for the hash table. For example, as noted above the hash scheme may include performing a modulo 2 division of the sub-segment value by a predetermined polynomial to determine a quotient and remainder value for each sub-segment. The remainder values may be the hash keys to access the hash table for the sub-segments. As indicated at 740, the hash table segments may be accessed at the different hash key values. Entries with matching common portions to the sub-segments may be identified, as indicated at 750. For instance, the quotient values generated by apply the hash scheme at 730 may be compared with quotient values stored in the entries. If quotient matches, then the entry may store a forwarding route with a common portion that matches the sub-segment used to calculate the quotient. Not all segments may return a match. For example, none of sub-segments 836 and 838 may match entries in the hash table. For those segments that do have a matching sub-segment, then the longest matching sub-segment may be identified (if more than one sub-segment matches). Consider an example where the destination address matches 0xABCDA in segment 824.

Thus sub-segments including at least a portion of 0xAB-CDA may match the respective sub-segments (e.g., 0xABCD, 0xABC, 0xAB, and 0xA). Note that in at least some embodiments, the hash scheme applied may only allow for the exact matching sub-segment (e.g., 0xABCDA) to be identified as a matching entry.

As indicated at 760, the longest matching entry of the identified matching entr(ies) may be selected as the entry with a common portion corresponding to a longest matching common portion of the destination address. For example, of matching entries identified for segments 822, 824, and 826, the matching entry in segment 826 may be determined as the longest matching entry, as segment 826 contains bits of lesser significance than segments 824 and 822. Note that the longest matching entry cannot be in a segment where prior segments did not return a matching entry. If, for instance, only segments 822, 826, and 828 returned a matching entry, then the longest matching entry is the entry of segment 822 (as segments in 826 and 828 have a prior segment 824 that does not match).

Route aggregation maps can be represented in different ways, distinguishing between different forwarding routes that share a common portion and different subsequent portions. As noted above, in at least some embodiments a trie bitmap may be implemented to describe different forwarding routes that share an entry, as well as provide a mechanism to locate an NHA table pointer for the described forwarding routes. FIG. 9 is a high-level flowchart illustrating various methods and techniques to evaluate a trie bitmap that provides route aggregation for a shared entry, according to some embodiments.

Figure 10:
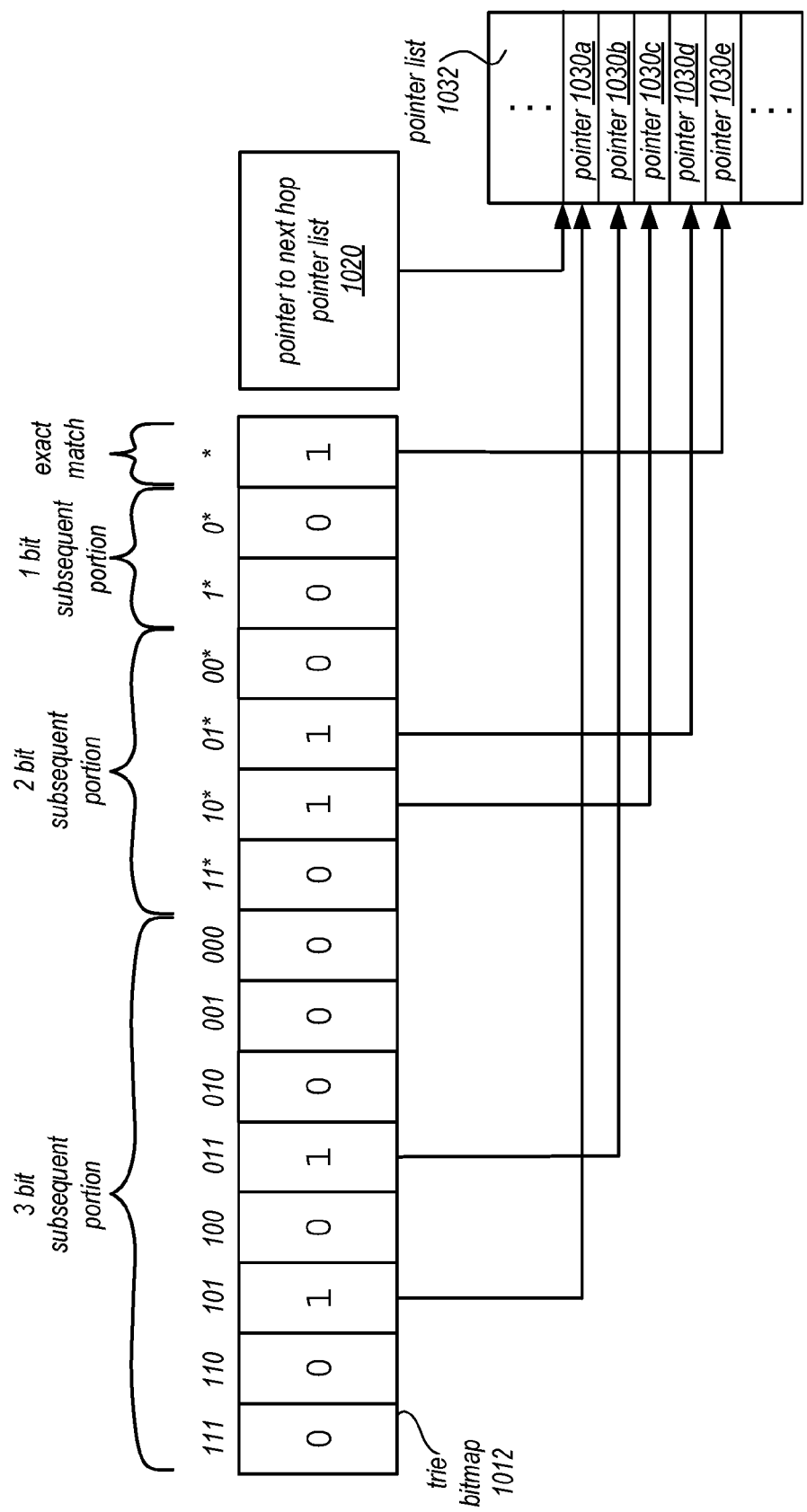
FIG. 10 is a logical diagram of a trie bitmap with entries for determining a pointer to a Next Hop Address table corresponding to the route identified in the trie bitmap, according to some embodiments.

As indicated at 910, bits from a longest possible subsequent portion to a common portion of an entry may be gotten from a destination address for a received network packet, in some embodiments. For example, prefix multiples may be implemented to store different lengths of common portions in shared in entries in the hash table. The number of bits between prefix multiples may represent the subsequent portions of forwarding routes with respect to a prefix multiple. Thus if prefix multiples are 8 (e.g., 8, 16, 24, and 32), the longest possible subsequent portion may be 7 bits, followed by 6 bits, 5 bits, 4 bits, and so on. FIG. 10 is a logical diagram of a trie bitmap with entries for determining a pointer to a Next Hop Address (NHA) table corresponding to the route identified in the trie bitmap, according to some embodiments. In FIG. 10, the longest possible subsequent portion is a 3 bit subsequent portion (indicating that prefix multiples may be multiples of 4).

Once the bits are retrieved, the corresponding entry in the trie bitmap may be accessed. For instance, if the 3 bits are retrieved, the 3 bit subsequent portion may be used to access a corresponding entry in trie bitmap 1012. If the 3 bits are "110," then the corresponding entry in trie bitmap 1012 is not set (e.g., stores a 0 value), indicating that the longest possible subsequent portion does not match a forwarding route sharing the entry. If, however, the 3 bits are "101," then the corresponding entry in trie bitmap 1012 is set (e.g., stores a value of "1"), indicating that a forwarding route that shares the entry matches the longest possible subsequent portion, the retrieved 3 bits (e.g., destination address has a longest portion=common portion+"101").

If no route is indicated, then a shorter possible subsequent portion may be evaluated, as indicated by the negative exit from 930. In at least some embodiments, a check may be performed, as indicated at 940 as to whether a shorter possible subsequent portion exists. For instance, if a 3 bit possible subsequent portion is checked, then a 2 bit possible subsequent portion exists to be checked, whereas if a 1 bit possible subsequent portion does not indicate a route, then no shorter possible subsequent portion may exist to be checked. In such cases, the common portion of the indicated route may be the longest matching portion of the destination address and, as indicated at 960, a NHA table pointer for the indicated route for the common portion may be determined. For example, a * star bit may be set in the trie bitmap, as illustrated in FIG. 10, to indicate that the common portion is an exact match for a forwarding route that shares the entry. The location of the set bit for the * may be determined with respect to other set bits in the trie bitmap 1012 to determine which pointer in pointer list 1032 corresponds to *. As illustrated in FIG. 10, in some embodiments, the pointers 1030 in pointer list 1032 may be ordered according to the ordering of set bits in trie bitmap 1012. Thus, * entry may correspond to the fifth pointer in the pointer list, pointer 1030e, by traversing the pointer list from the pointer to the next hop pointer list 1020 to the fifth entry.

If a possible subsequent portion exists to check, as indicated by the positive exit from 940, then the bits for the shorter possible subsequent portion to the common portion of the entry may be determined from the destination address. Continuing with the example above, 2 bits of the portion of the destination address trailing the common portion may be determined (e.g., "11"). Then, as indicated at 920, the trie bitmap may be accessed according to the bits of the shorter possible subsequent portion. The different possible subsequent portions may be checked until a route is indicated in the trie bitmap, or no possible subsequent portion remains to be checked.

If a route is indicated at 930, then an NHA table pointer for the indicated route may be determined based on the entry in the trie bitmap, as indicated at 970. Determining an NHA table pointer based on the indicated route in the trie bitmap allows for different pointers and ultimately different next hop addresses to be described by the same common portion and route aggregation map of a shared entry. For example, in at least some embodiments, each set bit in a trie aggregation may correspond to a different pointer in a list of pointers. Consider FIG. 10. The set bits for subsequent portions "101," "011," "10*," "01*," and "*" each correspond to different pointers, pointers 1030*a*, 1030*b*, 1030*c*, 103*d*, and 1030*e* respectively. To determine the corresponding entry, a pointer to the next hop pointer list 1020 may be modified (e.g., increased) by the number of set bits that occur up to the matching entry for the destination address. For example, if entry "10*" is determined to match a destination address, then the pointer to next hop pointer list may be increased by 3 (once each for prior set bits for "101" and "011" and once for set bits "10*") to point to pointer 1030*c*. In this way, different pointers for different forwarding routes may be discovered based on the same trie bitmap, even though the different pointers ultimately may point to different next hop addresses. Note that in various hardware or other software implementations the technique described above with regard to FIG. 10 may be performed in different orderings, such as performing elements in parallel. For instance, each entry in the trie bitmap may be checked in parallel, so that the earliest entry set in the bitmap (and therefore the longest) may be identified.

Figure 11:
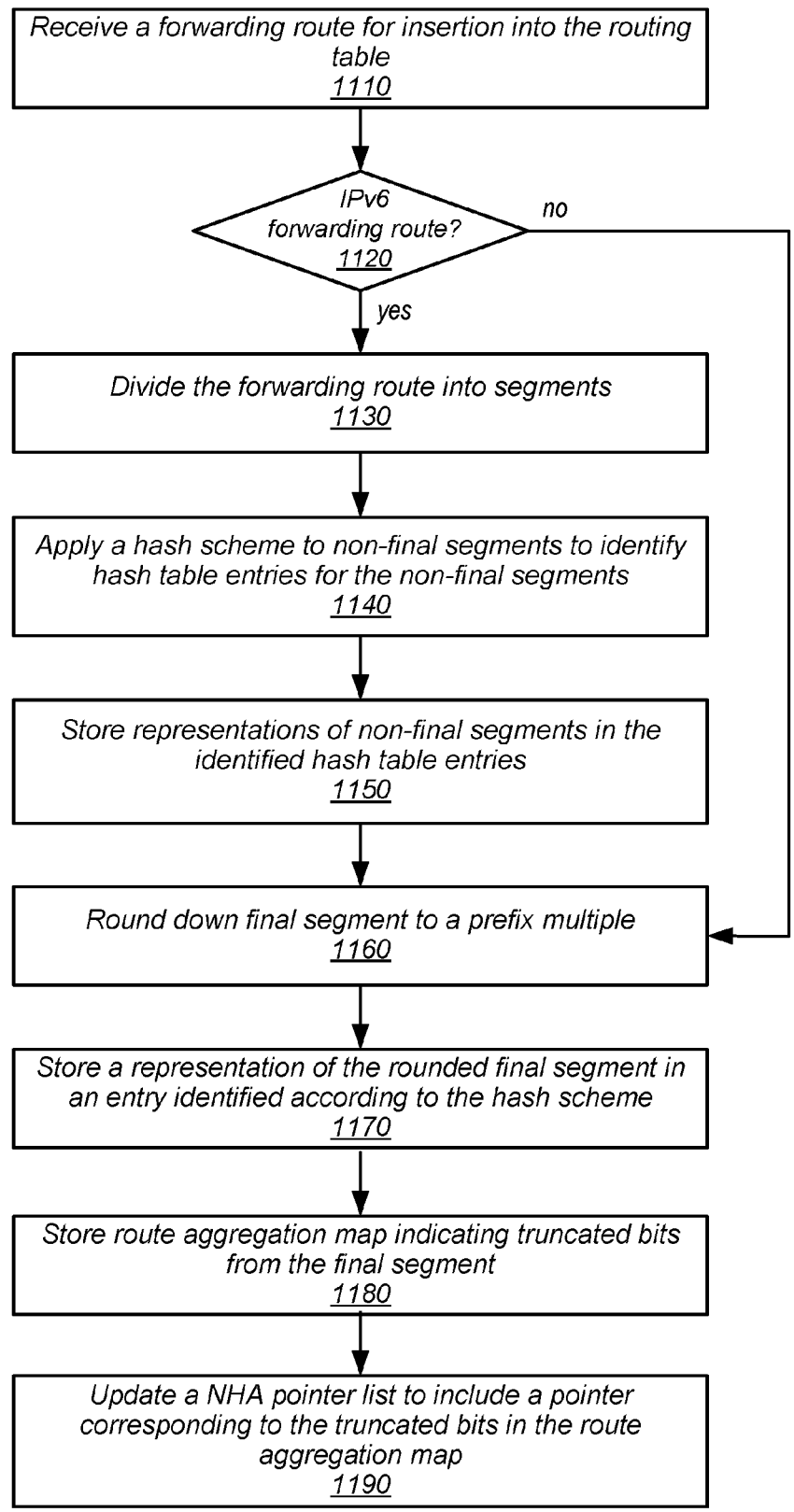
FIG. 11 is a high-level flowchart illustrating various methods and techniques to insert a forwarding route into a routing table that aggregates common portions of forwarding routes, according to some embodiments.

Routing tables that are maintained so that common portions of forwarding routes are aggregated may be updated so that new forwarding routes may be inserted or removed. Insertions or deletions of forwarding routes may be performed in such a way so that previously existing or remaining forwarding routes are still distinguishable in shared entries. FIG. 11 is a high-level flowchart illustrating various methods and techniques to insert a forwarding route into a routing table that aggregates common portions of forwarding routes, according to some embodiments.

As indicated at 1110, a forwarding route may be received for insertion into the routing table. A management application, controller or other process operating on a general purpose processor at or connected to a networking device may provide an interface that allows user to identify forwarding routes for insertion, such as program instructions 245 executing on general processor(s) 250 in FIG. 2, for example. In at least some embodiments, the type or format of the forwarding route may be determined. For instance, as indicated at 1120, a determination may be made as to whether the forwarding route is an IPv6 route. If not, then fewer or different steps may be performed to insert the IPv4 forwarding route, as illustrated by the negative exit from 1120 to element 1160. For example, an IPv4 forwarding route may be treated as a final segment in the elements discussed below at 1160 through 1190.

For IPv6 forwarding routes being inserted into the routing table, the forwarding route may be divided into segments, as indicated at 1130. The segment divisions may correspond to the number of hash table segments maintained in the memory maintaining the routing table. For example, if 4 hash table segments exist, then 4 segments may be created from the forwarding route (as discussed above with regard to FIG. 8). Note that not all IPv6 forwarding routes contain enough determinative bits (as opposed to don't care values) such that the number of segments for the forwarding route equal the number of hash table segments. Consider a forwarding route, AABB:CCDD:EEFF:1122:/66, where only the 66 most significant bits are identified and the rest of the bits are don't care values. Such a forwarding route may only have determinative bits for two 32 bit segments, AABB:CCDD/32 and EEFF:1122/32, and thus may only be divided into the two 32 bit segments.

As indicated at 1140, a hash scheme for the hash table may be applied to the non-final segments to identify hash table entries for the segments. For instance, in the example hash scheme described above, a quotient and remainder for the segment may be obtained based on a modulo 2 division of the segment value by a predetermined polynomial, wherein the remainder is used as the index to identify a corresponding entry in the hash table and the quotient is stored in the bucket for identification and comparison. As indicated at 1150, representations of the non-final segments (e.g., the quotients) may be stored in the identified hash table entries that correspond to the non-final segments. In at least some embodiments, representations of the segments may be mathematically chained to other non-final segments of the forwarding route may include information indicating or derived from a previous segment in the chain of forwarding route segments (e.g., the quotient value for the segment XOR'd with the remainder value for the previous segment in the chain). In this way, the relative position of the segments can be determined to select the longest matching portion in common with a destination address, as discussed above with regard to element 640 in FIG. 6. In some embodiments, if the entries with a same value for the non-final segment already exist and include such representations, then the storage of the representations at 1150 may be skipped.

The final segment of the forwarding route may be rounded down to a prefix multiple, as indicated at 1160, in various embodiments. A prefix multiple, as mentioned above, indicates the different desired common portion lengths that may be represented in hash table entries. For instance, the common portion lengths may be a multiple value greater than the number of possible truncation bits represented in a route aggregation map (e.g., multiples of 4 which would be greater than truncation bit lengths of 3 bits, 2 bits, or 1 bit). Rounding down a final segment may round down the segment value to a nearest prefix multiple. Consider the example final segment given above, EEFF:1122/30, which may be rounded down to EEFF:1120/28 (where the truncated 2 bits indicate a value of 2).

As indicated at 1170, a representation of the rounded final segment may be stored in an entry identified according to the hash scheme, as discussed above. For example a quotient value calculated for the rounded final segment may be stored. In some embodiments, the representation of a rounded down segment may be stored by shifting the rounded segment value to the right so that trailing bits generated by the rounding are not included. Bit values from a constant value may be used to replace the most significant bit values adjacent to the shifted segment value to generate a "full" segment." This full segment may then have the same hash scheme applied (e.g., generating a quotient and remainder). As with the representations discussed above with regard to element 1150, the representation of the non-final segment may be chained or linked to previous non-final segments for the forwarding route (e.g., by XORing the remainder of the previous non-final segment with the quotient determined for the final segment).

As indicated at 1180, in various embodiments, a route aggregation map indicating the truncated bits from the final segment as a result of the rounding down may be stored in the entry. For example, a trie bitmap, such as those illustrated in FIGS. 1 and 10 discussed above, may be generated (or if the entry already exists for another forwarding route, updated) and the corresponding bit for the truncated bits set. A trie bitmap may contain entries that indicate the various combinations and lengths of truncated bits between one prefix multiple and another. In the scenario described above at 1160 where the prefix multiple is 4, the number of bits between prefix multiples which may be truncated is up to 3 bits. Thus, in such a scenario, the trie bitmap may contain entries denoting the various combinations of 3 bits, 2 bits, or 1 bit that may be truncated. If no bits are truncated, then the route aggregation may be able to indicate an exact match for the prefix multiple (e.g., a * entry in a trie bitmap).

In at least some embodiments, redundant or shadowed forwarding routes in a trie bitmap may be eliminated before insertion. Consider the scenario illustrated in FIG. 10, where subsequent portions up to 3 truncated bits may be indicated in a trie bitmap. Shadowed or redundant forwarding routes may be those forwarding routes which would always match to a longer subsequent portion, and thus would never be selected. Such routes need not be maintained. For example, if forwarding routes are indicated by set entries for "10*" and 11*," then any possible 1 bit starting with "1" would not be selected as one of the 2 bit entries would result in a longer subsequent portion match. If a forwarding route were to be received for insertion that truncates to a "1" then such a forwarding route would be identified as redundant and not inserted into the forwarding table. By eliminating redundant routes, space in a pointer list may be conserved for distinct forwarding routes with different NHA.

As indicated at 1190, a NHA pointer list may be updated to include a pointer to an entry in the next hop address table storing a forwarding route corresponding to the route identified by the truncated bits in the route aggregation map. For example, as discussed above with regard to FIGS. 9 and 10, the order in which bits are set in a trie bitmap may indicate the location of a corresponding pointer in the list of pointers to an NHA map relative to a base or initial pointer list value included in the entry. Thus, if a forwarding route is inserted and maintained in a shared entry with pre-existing forwarding routes, a new pointer entry corresponding to the location of the bit set to indicate the new forwarding route may be created. If the new bit is in the middle of other set bits for other forwarding routes, the new pointer entry may be inserted between the pointer entries for the other set bits in order to correspond with the new set bit.

Figure 12:
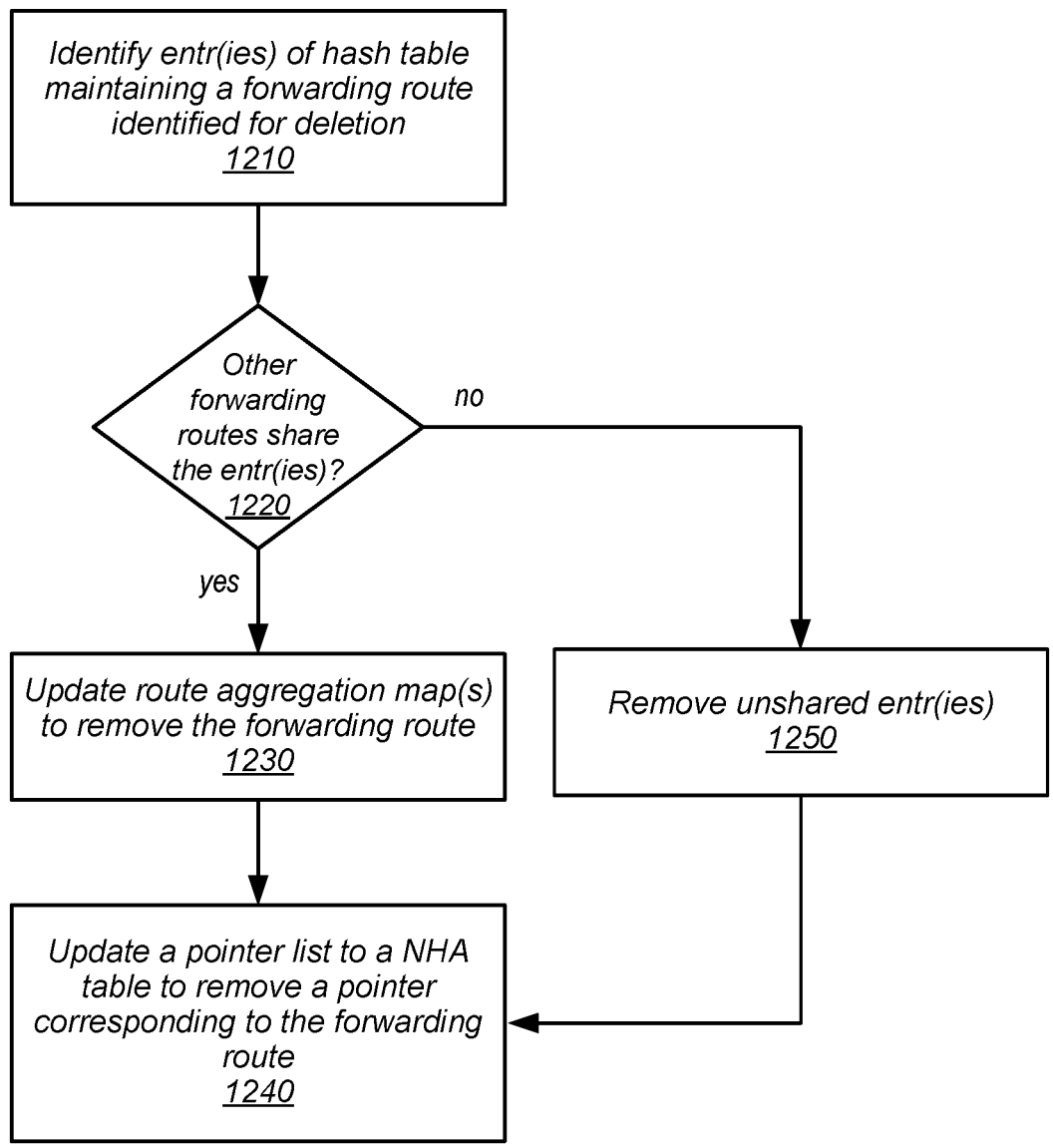
FIG. 12 is a high-level flowchart illustrating various methods and techniques to remove a forwarding route from a routing table that aggregates common portions of forwarding routes, according to some embodiments.

In addition to inserting additional forwarding routes into a routing table, forwarding routes with common portions stored in shared entries may also be removed from the routing table. FIG. 12 is a high-level flowchart illustrating various methods and techniques to remove a forwarding route from a routing table that aggregates common portions of forwarding routes, according to some embodiments. As indicated at 1210, a forwarding route may be identified for deletion. For instance, a management application, controller or other process operating on a general purpose processor at or connected to a networking device may provide an interface that allows user to identify forwarding routes for deletion. Similar to the techniques discussed above for looking up forwarding routes, entr(ies) of the hash table for a forwarding route may be identified by applying a hash scheme to the forwarding route to be removed. For instance, the forwarding route may be rounded down to a nearest prefix multiple (e.g., 4, 8, 12, 16, 20, 24, 28, 32). Thus, if the route is 10.20.30/22 then the route may be rounded down to 10.20.30/20, in one example. A hash key value may then be generated for the rounded down route (e.g., by performing polynomial division utilizing a predetermine polynomial on the rounded down route to determine a quotient and remainder, where the remainder is used as the hash key value). A similar technique may be performed for IPv6 forwarding routes, dividing the 128 bit forwarding route into segments (e.g., 32 bits each) and rounding down the final segment. Hash key values may then be generated for the non-final and the final segment.

As indicated at 1220, a determination may be made as to whether other forwarding routes share the entr(ies) identified at 1210. For those entr(ies) that are not shared, then, as indicated by the negative exit from 1220, the unshared entries may be deleted. For example, an entry for the forwarding route may include an aggregation map that is marked as valid. However, an evaluation of the route aggregation map only identifies one forwarding route, the forwarding route being deleted, as sharing the entry (e.g., only 1 bit is set in the trie bitmap or a scenario where the type of forwarding route indicated in the entry is IPv4 and the route aggregation map for the entry is marked as invalid). Such an entry may thus be deemed as not shared with other forwarding routes and the unshared entry deleted, marked for deletion or otherwise removed from consideration for processing subsequent network packets.

As indicated by the positive exit from 1220, in some embodiments, one or more entries for a forwarding route may be shared with other forwarding routes, maintaining a common portion for multiple forwarding routes include the forwarding route to be deleted. For example, the route aggregation map may identify multiple forwarding routes that share the common portion or the forwarding route may indicate that the route aggregation map is invalid (and thus a portion of at least one forwarding route maintained in another segment in the case of an IPv6 forwarding route). As indicated at 1230, the route aggregation map(s) for shared entries may be updated to remove the forwarding route 1230. In this way, forwarding routes can be deleted without removing information about other forwarding routes. For example, if the final segment of the forwarding route has 3 bits remaining (e.g., "110") then the corresponding bit in a trie bitmap in the shared entry may be changed from "1" to "0" so that the distinctive 3 bits of the forwarding route are no longer identified as sharing the entry by the trie bitmap.

In at least some embodiments, the pointer lest to a NHA table may be updated to remove (or mark as deleted/invalid) a pointer corresponding to the forwarding route, as indicated at 1240. For example, the entry in the pointer list that is identified by a trie bitmap entry plus an initial pointer list pointer may be marked so that when subsequent pointer list determinations are made for remaining forwarding routes the entry is skipped or otherwise not considered. For example, if prior to deletion of the forwarding route 5 forwarding routes were identified as sharing an entry in a trie bitmap so that 5 bits in the trie bitmap were set, and one of the bits is changed so that only 4 bits remain set in the trie bitmap, then when determining the location of the corresponding pointer in the pointer list, the entry for the deleted forwarding route may not be counted (e.g., if the deleted forwarding route was the 3$^{rd}$ entry out of the 5 entries, then the 3$^{rd}$ entry may be skipped when locating the pointer for the 3 bit out of the 4 set bits in the trie bitmap so that the technique locates the third valid pointer entry (not the third pointer entry).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
   a plurality of physical network interfaces;
   a memory, storing a routing table comprising a plurality of forwarding routes, wherein the forwarding routes are stored in segments of a hash table, wherein common portions of the forwarding routes are stored in shared entries of the hash table, wherein the shared entries of the hash table include respective route aggregation maps identifying different ones of the forwarding routes that share the common portions of the forwarding routes; and
   a packet processor, configured to:
      receive a network packet via one of the network interfaces;
      apply a hash scheme to a destination address for the network packet to identify different ones of the shared entries of the hash table segments to be read;
      read the identified entries from the segments of the hash table in the memory;
      determine a shared entry of the identified entries that maintains the common portion corresponding to a longest matching common portion of the destination address;
      evaluate the respective route aggregation map in the determined shared entry to select a forwarding route identified in the respective route aggregation map as the forwarding route that matches a longest portion of the destination address subsequent to the common portion of the shared entry; and
      forward the network packet according to the selected forwarding route.

2. The networking device of claim 1, wherein the route aggregation map is a trie bitmap, and wherein to evaluate the respective route aggregation map, the packet processor is configured to:
   determine bit values from possible subsequent portions to the common portion from the destination address;
   access the trie bitmap at entries corresponding to the bit values of the possible subsequent portions; and
   identify a set entry in the bitmap for a longest one of the possible subsequent portions as indicating that the longest possible subsequent portion is the subsequent portion that matches the longest portion of the destination address subsequent to the common portion of the shared entry.

3. The networking device of claim 1,
   wherein the destination address is an Internet Protocol version 6 (IPv6) address;
   wherein to apply the hash function, the packet processor is configured to:
      determine sub-segments of the segments according to different prefix multiples; and
      generate hash key values based on the sub-segments, wherein the hash key values correspond to the different shared entries.

4. The networking device of claim 1, further comprising:
   at least one general processor;
   and another memory, wherein the other memory stores program instructions that when executed by the at least one other processor causes the at least one other processor to:
      receive a new forwarding route for insertion into the routing table, wherein the new forwarding route is an Internet Protocol version 6 (IPv6) forwarding route;
      divide the new forwarding route into additional segments;
      apply the hash scheme to the additional segments to identify corresponding entries in the hash table to store the segments;
      for non-final ones of the additional segments, write representations of the non-final segments in those identified entries corresponding to the non-final segments;
      for a final segment of the additional segments:
         round down the final segment to a prefix multiple;
         write a representation of the rounded final segment in the identified entry corresponding to the final segment; and
         write a route aggregation map in the identified entry that indicates bit values of the final segment truncated from the final segment as a result of the rounding of the final segment.

5. A method, comprising:
   maintaining, in a memory accessible to a packet processor, a plurality of forwarding routes in a hash table, wherein common portions of the forwarding routes are maintained in shared entries of the hash table, wherein the shared entries of the hash table include respective route aggregation maps identifying different ones of the forwarding routes that share the common portions of the forwarding routes;

receiving, at the packet processor, a network packet;

accessing, by the packet processor, different ones of the shared entries of the hash table in the memory according to a hash scheme for the hash table applied to a destination address for the network packet to identify the common portion of one of the different shared entries as corresponding to a longest matching common portion of the destination address;

evaluating, by the packet processor, the respective route aggregation map in the shared entry of the identified portion to select a forwarding route identified in the respective route aggregation map as the forwarding route that matches a longest portion of the destination address subsequent to the common portion of the shared entry; and forwarding the network packet according to the selected forwarding route.

6. The method of claim 5, wherein the route aggregation map is a trie bitmap, and wherein evaluating the route aggregation map comprises:

determining bit values from possible subsequent portions to the common portion from the destination address;

accessing the trie bitmap at entries corresponding to the bit values of the possible subsequent portions; and identifying a set entry in the trie bitmap for a longest one of the possible subsequent portions as indicating that the longest possible subsequent portion is the subsequent portion that matches the longest portion of the destination address subsequent to the common portion of the shared entry.

7. The method of claim 6, wherein the shared entry includes a pointer to a list of pointers corresponding to respective next hop addresses for the forwarding routes, and wherein the method further comprises:

modifying the pointer based on the set entry trie bitmap to determine an entry in the list of pointers corresponding to the respective next hop address for the selected forwarding route; and accessing the entry in the list of pointers to obtain the respective next hop address, wherein the network packet is forwarded to the respective next hop address.

8. The method of claim 5, further comprising:

receiving, at a computing device with access to the memory maintaining the plurality of forwarding routes, a new forwarding route to include with the plurality of forwarding routes;

dividing the new forwarding route into segments;

applying the hash scheme to the segments to identify corresponding entries in the hash table to store the segments;

for non-final ones of the segments, storing representations of the non-final segments in those identified entries corresponding to the non-final segments;

for a final segment of the segments:

round down the final segment to a prefix multiple;

storing a representation of the rounded final segment in the identified entry corresponding to the final segment; and storing a route aggregation map in the identified entry that indicates bit values of the final segment truncated from the final segment as a result of the rounding of the final segment.

9. The method of claim 5, further comprising:

receiving another network packet at the packet processor with a different destination address; and performing the accessing, the evaluating, and the forwarding for the other network packet, wherein the selected forwarding route for the other network packet is a different forwarding route than the forwarding route selected for the network packet, wherein the route aggregation map evaluated to select the forwarding route for the other network packet is the same route aggregation map included in the same shared entry in the hash table as evaluated for the network packet.

10. The method of claim 5, further comprising:

prior to evaluating the respective route aggregation map included in the shared entry:

identifying another common portion of another one of the different shared entries that matches a longer portion of the destination address than the identified portion of the shared entry; and evaluating the respective route aggregation map included in the other shared entry to determine that the respective route aggregation map included in the other shared entry is not valid.

11. The method of claim 5, wherein the destination address is an Internet Protocol version 6 (IPv6) address.

12. The method of claim 11, wherein some of the plurality of forwarding routes are IPv6 forwarding routes, and wherein some other ones of the plurality of forwarding routes maintained in the same hash table are Internet Protocol version 4 (IPv4) forwarding routes.

13. The method of claim 5, wherein the packet processor is a general purpose processor executing program instructions that cause the general purpose processor to perform the receiving, the accessing, the evaluating, and the forwarding as part of a Layer 3 (L3) forwarding engine.

14. A system, comprising:

a device configured to perform packet processing, the device comprising;

an interface configured to transmit and receive packets via a network connection to the device;

a memory, storing a plurality of forwarding routes in a hash table, wherein common portions of the forwarding routes are maintained in shared entries of the hash table, wherein the shared entries of the hash table include respective route aggregation maps identifying different ones of the forwarding routes that share the common portions of the forwarding routes; and a packet processing pipeline, configured to:

receive a network packet via the network interface;

select different ones of the shared entries of the hash table segments to read according to a hash scheme for the hash table applied to a destination address for the network packet;

identify the common portion of one of the different shared entries read from the memory as corresponding to a longest matching common portion of the destination address;

evaluate the respective route aggregation map in the shared entry of the identified portion to select a forwarding route identified in the respective route aggregation map as the forwarding route that matches a longest portion of the destination address subsequent to the common portion of the shared entry; and forward the network packet according to the determined forwarding route.

15. The system of claim 14, wherein the route aggregation map is a trie bitmap, and wherein to evaluate the route aggregation map, the packet processing pipeline is configured to:
  determine bit values from possible subsequent portions to the common portion from the destination address;
  access the trie bitmap at entries corresponding to the bit values of the possible subsequent portions; and
  identify a set entry in the trie bitmap for a longest one of the possible subsequent portions as indicating that the longest possible subsequent portion is the subsequent portion that matches the longest portion of the destination address subsequent to the common portion of the shared entry.

16. The system of claim 15, wherein the shared entry includes a pointer to a list of pointers corresponding to respective next hop addresses for the forwarding routes, and wherein the packet processing pipeline is further configured to:
  modify the pointer based on the set entry trie bitmap to determine an entry in the list of pointers corresponding to the respective next hop address for the selected forwarding route; and
  access the entry in the list of pointers to obtain the respective next hop address, wherein the network packet is forwarded to the respective next hop address.

17. The system of claim 14, wherein some of the plurality of forwarding routes are IPv6 forwarding routes, and wherein other ones of the plurality of forwarding routes maintained in the same hash table are Internet Protocol version 4 (IPv4) forwarding routes.

18. The system of claim 14, wherein the packet processing pipeline is further configured to read the different shared entries of the hash table in parallel.

19. The system of claim 14, wherein the system device further comprises a general processor and another memory, wherein the other memory stores program instructions that when executed by the general processor causes the general processor to:
  identify an entry of the hash table that maintains one of the plurality of forwarding routes, wherein the one forwarding route is identified for deletion;
  determine that the identified entry of the hash table is a shared entry; and
  update the respective route aggregation map included in the identified entry to remove the one forwarding route identified for deletion.

20. The system of claim 14, wherein the device is an application specific integrated circuit (ASIC), a system-on-chip (SoC), or a field-programmable gate array (FPGA) configured to implement the selection, the identification, and the evaluation as part of a Layer 3 (L3) forwarding engine.

* * * * *